April 11, 1939. H. B. COOKE 2,154,064
MANUFACTURE OF GASOLINELIKE HYDROCARBONS
Filed Oct. 31, 1935
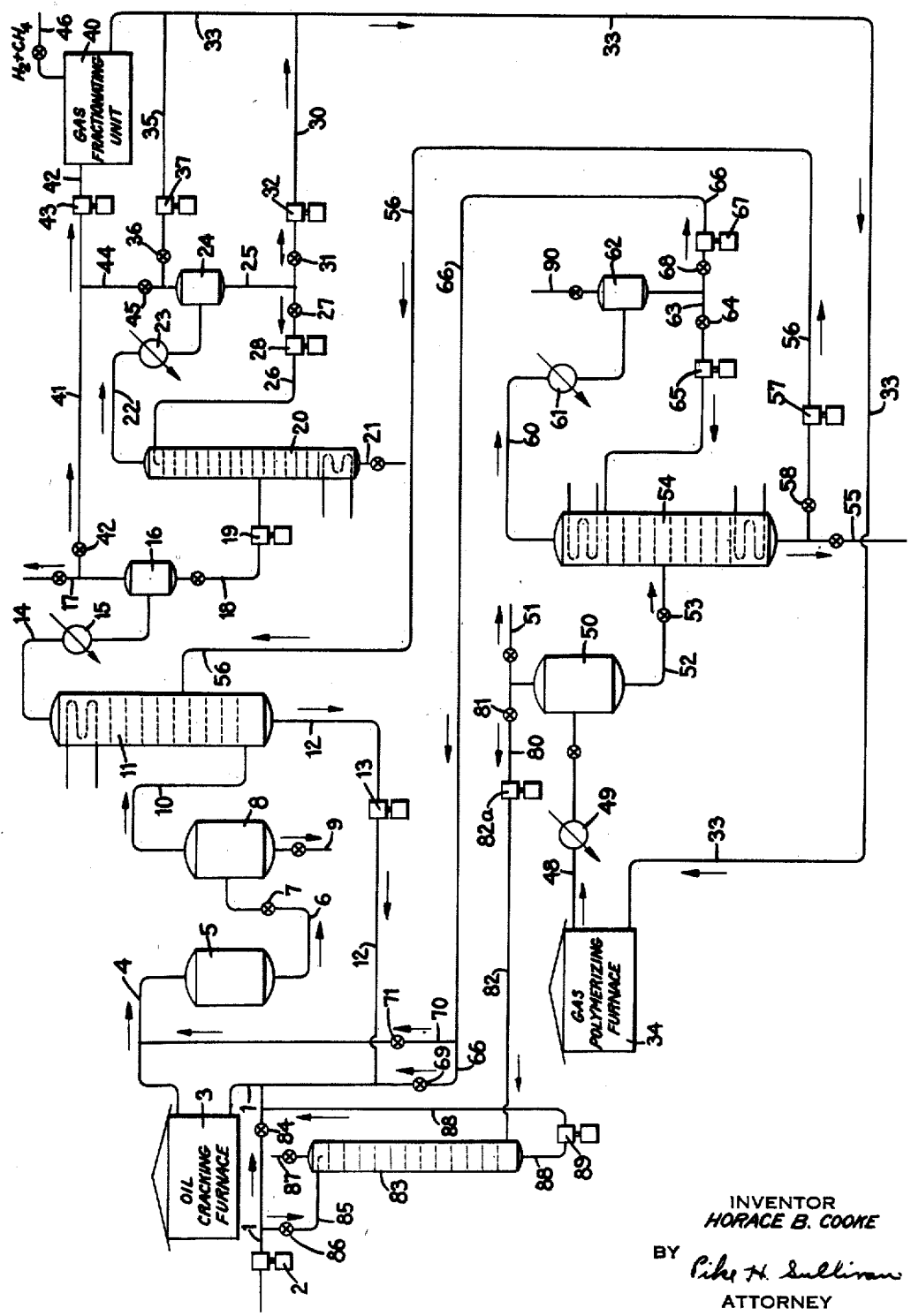
INVENTOR
HORACE B. COOKE
BY
Pike H. Sullivan
ATTORNEY Patented Apr. 11, 1939

2,154,064

UNITED STATES PATENT OFFICE 2,154,064

MANUFACTURE OF GASOLINELIKE HYDROCARBONS

Horace B. Cooke, Greenwich, Conn., assignor to Process Management Company, Inc., New York, N. Y., a corporation of Delaware Application October 31, 1935, Serial No. 47,540

6 Claims. (Cl. 196—9)

My invention relates to the conversion of hydrocarbon oils and gases to low-boiling normally liquid hydrocarbons suitable for use as motor fuel, and particularly to a combination oil cracking and gas polymerization operation.

My invention has for an object the provision of an improved process for the conversion of hydrocarbon oil to motor fuel, in which hydrocarbon oil is cracked to produce gasoline and normally gaseous hydrocarbons and wherein the latter are subjected to polymerization to produce motor fuel, with such improvements in operative advantages and results as may hereinafter be found to obtain.

Various processes, both thermal and catalytic, for the polymerization of normally gaseous hydrocarbons to gasoline-like products are known in the art, and a common starting material for such processes comprises the normally gaseous products of oil cracking operations including hydrocarbons having from two to four carbon atoms per molecule, which are ordinarily not retained in the finished gasoline produced in cracking oil. In all such gas polymerization processes, even where the gases produced in oil cracking are first concentrated to remove hydrogen and methane, it is difficult, if not impossible, to obtain anything like complete conversion of normally gaseous hydrocarbons of the character indicated, and the residue gases from gas polymerization operations consequently contain substantial quantities of hydrocarbons having from two to four carbon atoms per molecule, which are capable of being polymerized to valuable liquid products. In thermal processes and perhaps in some catalytic processes, more complete conversion may be attained by recycling residual hydrocarbons of this character in the gas polymerization operation but such recycling reduces the effectiveness of the operation on a once-through basis and may have other disadvantages. In at least one well-known type of catalytic polymerizing process, recycling is known to be undesirable.

According to my invention, hydrocarbon gases produced by cracking oil are subjected to polymerization in a unit of either thermal or catalytic type, without recycling, and hydrocarbons of from two to four carbon atoms per molecule, which are either unconverted in the gas polymerizing operation or are formed therein as a result of the reactions taking place, are delivered to the oil cracking operation after conversion and polymerization in the presence of the hydrocarbon oil undergoing cracking.

Both the gases produced in the oil cracking operation and the residue gases from the gas polymerizing operation may be concentrated in any suitable manner in order to remove hydrogen and methane therefrom and, in the latter instance, the residue gases from the gas polymerizing operation may, if desired, be scrubbed to remove hydrogen and methane by means of the oil charging stock delivered to the oil cracking operation.

It will be obvious from the above that my invention is susceptible of modification with respect to the specific character of the oil cracking and gas polymerizing operations and also in respect of the manner of recovery of valuable liquid products and gases from both the oil cracking and gas polymerizing unit, but in order that my invention may be fully set forth and understood, I now describe, with reference to the drawing accompanying and forming part of this specification, various preferred forms and manners in which my invention may be practiced and embodied. In this drawing, The single figure is a more or less diagrammatic elevational view of a combined oil cracking and gas polymerizing unit in which my invention may be embodied and carried out.

Referring now to the figure, hydrocarbon oil to be cracked, for example, a gas oil, a reduced crude, or even a straight run gasoline suitable for re-forming to higher octane value, is delivered by means of a line 1 and a pump 2 to a suitable cracking furnace 3 wherein the oil is subjected to pressure and temperature conditions effective to produce the desired degree of conversion. Thus, for example, temperatures from 850° to 1050° F. and pressures of 100 to 1000 lbs. per square inch may be employed. The heated products pass through a line 4 to a reaction zone or vessel 5, where they may be permitted to remain for the period of time necessary to complete the cracking operation. It will be understood that instead of employing an enlarged reaction chamber 5 the necessary soaking time may be provided by passing the heated products through a soaking coil located within the furnace 3.

The products from the reaction zone 5 then pass through a line 6 having a pressure-reducing valve 7 into an evaporator 8 of conventional design, from which heavy residual products are removed through a valved line 9 while vapors pass overhead through a line 10 to a fractionator or bubble tower 11, also of conventional design as illustrated. In the fractionator 11, the vapors are cooled and fractionated to condense and separate constituents having boiling points higher than the desired gasoline product, for example, gas oil. Bottoms from the fractionating tower 11 may be returned through a line 12 having a pump 13 to the oil cracking furnace 3, while overhead vapors and gases pass through a vapor line 14 to a condenser 15 and thence to a gas separator 16.

The foregoing description and such portions of the drawing as correspond thereto are intended to disclose conventional oil cracking apparatus and it will be understood that the details of this oil cracking apparatus may be varied considerably without departing from my invention.

It will further be understood that in practice the pressure maintained in the gas separator 16 may vary considerably and that the pressure maintained at this point will determine to a considerable extent whether normally gaseous hydrocarbons of from two to four carbon atoms per molecule remain vaporous at this point, or condense with the gasoline condensate, or are distributed between the uncondensed gases and gasoline withdrawn from the separator 16. Where the separator 16 is maintained under fairly high pressure, the gases withdrawn from the separator will comprise largely hydrogen and methane, and may be withdrawn through a valved line 17 and discharged from the system. The gasoline condensate, containing most of the hydrocarbons desired for polymerization passes through a valved line 18, which may be provided with a pump 19, into a conventional stabilizer 20.

In the stabilizer 20 the gasoline is rectified under pressure to remove undesirably light hydrocarbons consisting primarily of gaseous hydrocarbons of from two to four carbon atoms per molecule. Stabilized gasoline distillate is removed through a valved line 21 and overhead vapors pass through a line 22 to a condenser 23 and a receiver 24. The stabilizer 20 and receiver 24 are preferably maintained under pressure, for example from 100 to 400 lbs. per square inch, and the specific pressure will determine the degree of liquefaction of the normally gaseous hydrocarbons of from two to four carbon atoms per molecule. In the ordinary instance, these will be entirely or largely liquefied and the products will be withdrawn from the receiver 24 through a line 25. A portion of the liquid products may be delivered by means of the line 26 having a valve 27 and a pump 28 to the upper portion of the stabilizer 20 as reflux therefor. Such hydrocarbons having from two to four carbon atoms per molecule as are not required for refluxing to the stabilizer 20 are withdrawn through a line 30 having a valve 31 and a pump 32 and delivered through a line 33 to a suitable gas polymerizing furnace 34.

If overhead products from the receiver 24 are sufficiently free from hydrogen and methane, they may be delivered by means of a line 35 having a valve 36 and a compressor 37 to the line 33 and thence to the gas polymerizing furnace 34.

Overhead products from the separator 16 will ordinarily contain considerable quantities of hydrogen and methane, and hydrogen and methane may also be present in undesirably large concentration in overhead products from the receiver 24. Where, in either instance, such overhead products contain sufficient quantities of gaseous hydrocarbons of from two to four carbon atoms per molecule to warrant recovery of the latter, such gases may be fractionated in any suitable manner, by means of a suitable gas fractionating unit illustrated diagrammatically at 40. Thus overhead products from the separator 16 may be withdrawn therefrom through a line 41 having a valve 42, to pass to the gas fractionating unit through a line 42 having a compressor 43, and overhead gases from the receiver 24 may pass through a line 44 having a valve 45 and thence through the line 42 and compressor 43 to the fractionating unit 40.

The gas fractionating unit 40, which is not illustrated in detail, may, as has been indicated, comprise any suitable unit for the purpose of separating hydrogen and methane from gaseous hydrocarbons suitable for polymerization, and may comprise, for example, a conventional absorber and stripper cycle in which the gases are contacted with a suitable hydrocarbon absorbent oil, the enriched oil being then distilled to separate the absorbed constituents. Such a system will ordinarily be operated under a pressure of from 100 to 500 lbs. per square inch. Residual gases, comprising largely hydrogen and methane, are removed through a valved line 46, while the concentrated paraffins and olefins of from two to four carbon atoms per molecule are passed by way of the line 33 to the gas polymerizing furnace 34.

It will be apparent to those skilled in the art that the manner of separation and fractionation of the feed gases for the gas polymerizing unit will vary in accordance with the character of the products of cracking and the manner in which the normally liquid products of cracking are fractionated. In any event, however, the hydrocarbon gases or vapors intermediate between fixed gases (hydrogen and methane) and gasoline are in some suitable manner segregated for delivery to the gas polymerizing unit, the degree of separation being as complete as is economically and technically feasible.

In traversing the gas polymerizing furnace 34, the hydrocarbons are subjected to a suitable temperature and pressure and for a suitable period of time, to effect the desired polymerization to gasoline-like constituents. Where no catalyst is employed or where any catalytic effect is secondary, high pressures and moderately high temperatures may be employed, for example, from 500 to 3000 lbs. per square inch and from 750° to 1250° F. Where catalysts are employed, the temperature or pressure or both may be varied in accordance with the requirements of the particular catalyst employed. Various catalysts for this purpose are known, of which sodium aluminum chloride and phosphoric acid catalysts may be cited as examples. The temperatures and pressures in the case of catalytic processes may be reduced to as low as 250° to 600° F. and 100 to 500 lbs. per square inch, respectively. In any event, however, the gases are subjected to such conditions either with or without the presence of a catalyst for a sufficient time to effect a maximum degree of conversion to gasoline-like products, while avoiding as far as possible polymerization to higher-boiling products on the one hand and mere cracking to gaseous olefins on the other hand. At temperatures above 1250° F., liquid products of a highly aromatic nature may be formed in considerable amount. In this type of operation, pressures as low as 200 lbs. per square inch or even lower may be employed. My invention is, however, especially adapted for use in connection with gas polymerizing operations which are carried out to produce substantially non-aromatic products at elevated temperatures and pressures, with or without catalysts.

The products leaving the gas polymerizing furnace 34, with or without further soaking as may be required, are then cooled and fractionated in any suitable manner to separate them into fixed gases, gasoline and heavier oil and intermediate hydrocarbons having from two to four carbon atoms per molecule. It will be obvious to those skilled in the art that various methods of accomplishing this purpose are available but I have illustrated and will describe a preferred manner in which this may be accomplished.

In this example, the products from the furnace 34 pass by way of a line 48 wherein is located a suitable cooling means 49 to a high pressure separator 50. The degree of cooling effected by means of the indirect heat exchanger 49, and which may be substituted or augmented if desired by means of direct injection of hydrocarbon gases or oil, is such as to quench the products from the furnace 34 to below a temperature at which further conversion will take place.

Where the pressure maintained in the separator 50 is high enough to prevent escape of hydrocarbons of from two to four carbon atoms per molecule in gaseous or vaporous form, the hydrogen and methane which separate may be discharged through a valved line 51, while the gasoline and any heavier oil plus the absorbed intermediate hydrocarbons of lower boiling points pass through a line 52 having a pressure-reducing valve 53 into a conventional fractionator 54. Gasoline and heavier constituents, condensed in the fractionator 54, may be withdrawn therefrom through a valved line 55 and may if desired, be fractionated at a still lower pressure to separate gasoline constituents from higher-boiling constituents in suitable fractionating apparatus (not shown). Alternatively, bottoms from the fractionator 54 may be delivered by means of a line 56 having a pump 57 and a valve 58 to the fractionating tower 11 for fractionation and recovery. In the latter instance, the polymerized gasoline-like products would be recovered at 21.

Overhead products from the fractionator 54 passes through a line 60 to a condenser 61 and receiver 62 from which a portion of the liquid condensate may be delivered through a line 63 having a valve 64 and a pump 65 to the fractionator 54 as reflux, while such of the hydrocarbons of from two to four carbon atoms per molecule as are not required for refluxing in the fractionator 54 are delivered by means of a line 66 having a pump 67 and valves 68 and 69 to the line 1 and thence to the oil cracking furnace 3. Alternatively, these liquefied hydrocarbons may be delivered by means of a branch line 70 having a valve 71 to the transfer line 4 leading from the oil cracking furnace 3 to the reaction chamber 5. In any event, however, these light hydrocarbons of from two to four carbon atoms per molecule are commingled with the hydrocarbon oil undergoing or about to undergo conversion in the oil cracking unit and are subjected to the same conditions of temperature and pressure which obtain in the oil cracking unit, whereby these hydrocarbons are polymerized to normally liquid products. Such polymerization or conversion is aided by inter-reactions which take place between the light hydrocarbons thus introduced, and oil constituents undergoing conversion or the products of such conversion. The conversion or polymerization or inter-action is enhanced and made operative by the fact that the light hydrocarbons thus delivered are substantially free from hydrogen and methane, which would exert a diluent and retarding effect.

Where the gases and vapors separated at 50 contain in addition to hydrogen and methane substantial quantities of hydrocarbons of from two to four carbon atoms per molecule suitable for polymerization as, for example, when the separator 50 is maintained under a relatively low pressure, these gases may be fractionated to remove hydrogen and methane and the concentrated hydrocarbons of from two to four carbon atoms per molecule may be delivered through a line 80 having a valve 81 and a compressor 82 and thence through a line 82 to a suitable gas fractionating apparatus. In the preferred instance illustrated in the drawing, these hydrocarbons may be delivered under a pressure of from 100 to 500 lbs. per square inch to an absorber 83 where they are scrubbed with a portion or all of the cold oil charged to the oil cracking furnace 3. For this purpose, a valve 84 is provided in the line 1 and the line 1 communicates with a branch line 85 having a valve 86 and leading to the upper portion of the absorber 83. A portion or all of the cool charging oil is delivered to the absorber 83. During the countercurrent contact of gases and oil in the absorber 83, constituents having boiling points above methane are absorbed by the relatively heavy hydrocarbon oil. Unabsorbed hydrogen and methane are removed through a valved line 87 and discharged from the system. The enriched hydrocarbon oil withdrawn from the bottom of the absorber 83 and containing absorbed hydrocarbons of from two to four carbon atoms per molecule then passes by way of a line 88, wherein may be located a pump 89, back into the line 1 at a point beyond the valve 84 and into the oil cracking furnace, 3.

It will be obvious to those skilled in the art that either gases from the separator 50 or condensate from the receiver 62 or both may be delivered to the oil cracking unit, the object being in any event to segregate hydrocarbons of from two to four carbon atoms per molecule from gasoline-like products on the one hand and from hydrogen and methane on the other hand, and to return these segregated hydrocarbons to the oil cracking unit for polymerization in the presence of oil undergoing cracking.

The receiver 62 may be provided with a valved gas vent 90 for use where necessary, and where the quantity of gases withdrawn at this point is sufficiently high, these gases may also be delivered with or without fractionation to remove hydrogen and methane, as required, to the oil cracking unit for further conversion in the presence of the oil undergoing cracking.

It will be apparent from the above that products from the gas polymerizing operation intermediate between hydrogen and methane on the one hand and gasoline-like products on the other hand are not recycled in the gas polymerizing unit but are returned to the oil cracking unit, where by reason of their character and concentration they are converted or polymerized to valuable normally liquid products of a motor fuel character, without necessitating operation of the gas polymerizing unit under recycling conditions. In addition to other advantages which will be apparent from the above, my process possesses the advantage that constituents which are not converted in the gas polymerizing operation, or are produced as a result of the reactions taking place in the gas polymerizing unit, are separately polymerized, such polymerization advantageously taking place in the presence of oil undergoing cracking.

To illustrate this advantage more specifically, it may be pointed out that, for example, in catalytic gas polymerizing operations, certain constituents, such for example as ethylene, may undergo polymerization to a negligible extent as compared with other constituents, and may in fact be produced as a result of the decomposition of other hydrocarbons. Recycling of such constituents would obviously place a considerable burden upon the gas polymerizing unit without any attendant advantage, whereas, according to my process, such constituents, for example, ethylene, are advantageously delivered to the oil cracking unit where they are subjected to conditions effective to promote their polymerization and conversion in the presence of the oil undergoing cracking with the result that an increased yield of gasoline-like products is obtained from the process as a whole in a simple and economical manner.

In referring to hydrocarbons having from two to four carbon atoms per molecule, I have intended to designate gaseous hydrocarbon mixtures containing such constituents as ethane, ethylene, propane, propylene, butanes and butylenes, or mixtures of any of these in various proportions. In referring to the separation of hydrogen and methane, it will be understood that I contemplate separation of these constituents as completely as is economically feasible but I recognize the fact that some higher-boiling constituents may be present in the hydrogen and methane separated, and that, on the other hand, it may not be practicable to absolutely completely remove hydrogen and methane in any of the various gas fractionating steps. In any event, however, concentrations of more than, say, 10 per cent of hydrogen and methane in the light hydrocarbons charged to the gas polymerizing unit or the oil cracking unit are ordinarily to be avoided, by reason of the diluent effect of hydrogen and methane. Moreover, if desired, ethane and ethylene may also be eliminated along with hydrogen and methane in any one or all of the gas fractionating steps wherever this proves advantageous, on account of the relatively slow rate of conversion of ethane and ethylene as compared with hydrocarbons of three and four carbon atoms per molecule, although I ordinarily prefer to retain these constituents for polymerization.

It will be obvious to those skilled in the art that, while I have illustrated and described my invention hereinabove with reference to various preferred forms and embodiments by way of illustrative example, my invention may variously be practiced and embodied within the scope of the claims hereinafter made.

I claim:

1. The process of obtaining low-boiling normally liquid gasoline-like hydrocarbons from hydrocarbon oil which comprises subjecting such oil to elevated temperature and pressure effective to crack the same, fractionating the cracked products to recover products heavier than gasoline, fixed gases and products intermediate in boiling range between the fixed gases and gasoline, separately subjecting said intermediate products to elevated pressure and temperature not exceeding about 1250° F. effective to cause a maximum degree of polymerization to normally liquid gasoline-like products, separately separating the products of polymerization into normally gaseous products including said gasoline-like products and normally liquid products, scrubbing said normally gaseous products under pressure with at least a portion of the oil charged to the cracking operation prior to said cracking operation, whereby hydrocarbons having from 2 to 4 carbon atoms per molecule are separated from hydrogen and methane, absorbed in said oil, and caused to undergo conversion and polymerization to normally liquid products in the presence of the hydrocarbon oil undergoing cracking and conversion.

2. The process of obtaining low-boiling normally liquid gasoline-like products from hydrocarbon oil which comprises subjecting such oil to elevated temperature and pressure effective to crack the same, fractionating the cracked products to recover products heavier than gasoline, fixed gases and products intermediate in boiling range between the fixed gases and gasoline, separately subjecting said intermediate products to elevated pressure and temperature effective to cause a maximum degree of polymerization to normally liquid gasoline-like products, separately separating the products of polymerization into normally liquid products including said gasoline-like products, fixed gases and intermediate material, scrubbing said fixed gases from said polymerization products under pressure with at least a portion of the oil charged to the cracking operation prior to said cracking operation whereby hydrocarbons having from two to four carbon atoms per molecule are separated from hydrogen and methane by being absorbed in said oil, introducing at least a portion of said separately obtained last-mentioned intermediate material directly into the stream of hydrocarbon oil undergoing cracking and conversion, whereby said hydrocarbons having from two to four carbon atoms per molecule absorbed in the oil charged to the cracking operation and said intermediate material introduced directly into said oil are caused to undergo conversion and polymerization to normally liquid products in the presence of the hydrocarbon oil undergoing cracking and conversion.

3. The process of obtaining low-boiling normally liquid gasoline-like products from hydrocarbon oil which comprises subjecting such oil to elevated temperature and pressure effective to crack the same, fractionating the cracked products to recover products heavier than gasoline, fixed gases and products intermediate in boiling range between the fixed gases and gasoline, separately subjecting said intermediate products to elevated pressure and temperature effective to cause a maximum degree of polymerization to normally liquid low-boiling hydrocarbons, separately separating the products of polymerization into normally liquid gasoline-like products, fixed gases and intermediate material, introducing said normally liquid products to the stream of cracked products including said gasoline-like products undergoing fractionation, scrubbing said fixed gases from said polymerization products under pressure with at least a portion of the oil charged to the cracking operation prior to said cracking operation whereby hydrocarbons having from two to four carbon atoms per molecule are separated from hydrogen and methane by being absorbed in said oil, introducing at least a portion of said separately obtained last-mentioned intermediate material directly into the stream of hydrocarbon oil undergoing cracking and conversion whereby said hydrocarbons having from two to four carbon atoms per molecule absorbed in the oil charged to the cracking operation and said intermediate material introduced directly into said oil are caused to undergo conversion and polymerization to normally liquid products in the presence of the hydrocarbon oil undergoing cracking and conversion.

4. The process of obtaining low-boiling normally liquid gasoline-like products from hydrocarbon oil which comprises subjecting such oil to elevated temperature and pressure effective to crack the same, fractionating the cracked products to recover products heavier than gasoline, fixed gases and products intermediate in boiling range between the fixed gases and gasoline, separately subjecting said intermediate products to elevated pressure and temperature effective to cause a maximum degree of polymerization to normally liquid gasoline-like products, separately separating the products of polymerization into normally liquid products including said gasoline-like products, fixed gases and intermediate material, scrubbing said fixed gases from said polymerization products under pressure with at least a portion of the oil charged to the cracking operation prior to said cracking operation whereby hydrocarbons having from two or four carbon atoms per molecule are separated from hydrogen and methane by being absorbed in said oil, and introducing said enriched oil from said scrubbing operation directly into the stream of oil undergoing conversion whereby said hydrocarbons having from two to four carbon atoms per molecule absorbed in oil being charged to the cracking operation undergo conversion and polymerization to normally liquid products in the presence of the hydrocarbon oil undergoing cracking.

5. In a process wherein hydrocarbon oil is converted into gasoline-like hydrocarbons and normally gaseous hydrocarbons and normally gaseous hydrocarbons thus obtained are separately polymerized to normally liquid hydrocarbons including gasoline-like products, the improvement that comprises separating the products of polymerization into normally liquid hydrocarbons including said gasoline-like products and normally gaseous hydrocarbons, scrubbing at least a part of said normally gaseous hydrocarbons, thus separated with at least a portion of the oil charged to the conversion operation prior to said conversion operation, whereby higher molecular weight constituents of gases are absorbed by said oil and lighter molecular weight constituents of said gases are rejected thereby and introducing the enriched oil from said scrubbing operation into the stream of oil undergoing conversion whereby said higher molecular weight constituents of said gases absorbed in oil charged to the conversion operation undergo conversion to normally liquid products in the presence of the hydrocarbon oil undergoing conversion.

6. A process in accordance with claim 5 wherein products resulting from the conversion of said hydrocarbon oil and the liquid products of polymerization including said gasoline-like products are fractionated in a common fractionating zone wherein said gasoline-like products resulting from polymerization are for the first time permanently separated from higher boiling liquid products of polymerization.

HORACE B. COOKE.

CERTIFICATE OF CORRECTION.

Patent No. 2,154,064. April 11, 1939.

HORACE B. COOKE.

It is hereby certified that error appears in the printed specification of the above numbered patent requiring correction as follows: Page 3, first column, line 45, for the word "passes" read pass; page 4, second column, lines 2 and 3, claim 1, for the words "including said gasoline-like products and normally liquid products" read and normally liquid products including said gasoline-like products; same page and column, lines 64 and 65, claim 3, strike out the words "including said gasoline-like products" and insert the same before "to" in line 64, same claim; page 5, second column, line 13-14, claim 5, after "hydrocarbons" strike out the comma; and that the said Letters Patent should be read with this correction therein that the same may conform to the record of the case in the Patent Office.

Signed and sealed this 1st day of August, A. D. 1939.

Henry Van Arsdale,
Acting Commissioner of Patents.

(Seal)

undergoing cracking and conversion whereby said hydrocarbons having from two to four carbon atoms per molecule absorbed in the oil charged to the cracking operation and said intermediate material introduced directly into said oil are caused to undergo conversion and polymerization to normally liquid products in the presence of the hydrocarbon oil undergoing cracking and conversion.

4. The process of obtaining low-boiling normally liquid gasoline-like products from hydrocarbon oil which comprises subjecting such oil to elevated temperature and pressure effective to crack the same, fractionating the cracked products to recover products heavier than gasoline, fixed gases and products intermediate in boiling range between the fixed gases and gasoline, separately subjecting said intermediate products to elevated pressure and temperature effective to cause a maximum degree of polymerization to normally liquid gasoline-like products, separately separating the products of polymerization into normally liquid products including said gasoline-like products, fixed gases and intermediate material, scrubbing said fixed gases from said polymerization products under pressure with at least a portion of the oil charged to the cracking operation prior to said cracking operation whereby hydrocarbons having from two or four carbon atoms per molecule are separated from hydrogen and methane by being absorbed in said oil, and introducing said enriched oil from said scrubbing operation directly into the stream of oil undergoing conversion whereby said hydrocarbons having from two to four carbon atoms per molecule absorbed in oil being charged to the cracking operation undergo conversion and polymerization to normally liquid products in the presence of the hydrocarbon oil undergoing cracking.

5. In a process wherein hydrocarbon oil is converted into gasoline-like hydrocarbons and normally gaseous hydrocarbons and normally gaseous hydrocarbons thus obtained are separately polymerized to normally liquid hydrocarbons including gasoline-like products, the improvement that comprises separating the products of polymerization into normally liquid hydrocarbons including said gasoline-like products and normally gaseous hydrocarbons, scrubbing at least a part of said normally gaseous hydrocarbons, thus separated with at least a portion of the oil charged to the conversion operation prior to said conversion operation, whereby higher molecular weight constituents of gases are absorbed by said oil and lighter molecular weight constituents of said gases are rejected thereby and introducing the enriched oil from said scrubbing operation into the stream of oil undergoing conversion whereby said higher molecular weight constituents of said gases absorbed in oil charged to the conversion operation undergo conversion to normally liquid products in the presence of the hydrocarbon oil undergoing conversion.

6. A process in accordance with claim 5 wherein products resulting from the conversion of said hydrocarbon oil and the liquid products of polymerization including said gasoline-like products are fractionated in a common fractionating zone wherein said gasoline-like products resulting from polymerization are for the first time permanently separated from higher boiling liquid products of polymerization.

HORACE B. COOKE.

CERTIFICATE OF CORRECTION.

Patent No. 2,154,064. April 11, 1939.

HORACE B. COOKE.

It is hereby certified that error appears in the printed specification of the above numbered patent requiring correction as follows: Page 3, first column, line 45, for the word "passes" read pass; page 4, second column, lines 2 and 3, claim 1, for the words "including said gasoline-like products and normally liquid products" read and normally liquid products including said gasoline-like products; same page and column, lines 64 and 65, claim 3, strike out the words "including said gasoline-like products" and insert the same before "to" in line 64, same claim; page 5, second column, line 13-14, claim 5, after "hydrocarbons" strike out the comma; and that the said Letters Patent should be read with this correction therein that the same may conform to the record of the case in the Patent Office.

Signed and sealed this 1st day of August, A. D. 1939.

Henry Van Arsdale,
Acting Commissioner of Patents.

(Seal)